(12) United States Patent
Benton

(10) Patent No.: US 6,813,946 B1
(45) Date of Patent: Nov. 9, 2004

(54) LIQUID SENSING

(75) Inventor: Frances H. Benton, Keene, NH (US)

(73) Assignee: Markem Corporation, Keene, NH (US)

( * ) Notice: Subject to any disclaimer, the term of this patent is extended or adjusted under 35 U.S.C. 154(b) by 0 days.

(21) Appl. No.: 10/457,216

(22) Filed: Jun. 9, 2003

(51) Int. Cl.[7] .................................................. G01F 23/30
(52) U.S. Cl. .......................... 73/309; 73/290 R; 73/305; 73/314; 73/319
(58) Field of Search ............................... 73/290 R, 305, 73/309, 314, 319

(56) References Cited

U.S. PATENT DOCUMENTS

| | | | | |
|---|---|---|---|---|
| 3,611,220 A | * | 10/1971 | Hoffman | ..................... 335/207 |
| 3,781,498 A | * | 12/1973 | Kamil et al. | ............... 200/84 C |
| 5,076,101 A | * | 12/1991 | Lazure | ...................... 73/290 V |
| 6,253,611 B1 | * | 7/2001 | Varga et al. | .................. 73/319 |
| 6,289,728 B1 | * | 9/2001 | Wilkins | ....................... 73/149 |

* cited by examiner

Primary Examiner—Hezron Williams
Assistant Examiner—Rodney Frank
(74) Attorney, Agent, or Firm—Fish & Richardson P.C.

(57) ABSTRACT

Liquid sensing apparatuses and liquid sensing methods are described. In some embodiments, a liquid sensing apparatus includes a magnetic element; a source magnetic field, which produces on the magnetic element a magnetic force with a component that opposes a gravitational force on the magnetic element; and a structure configured to prevent rotation of the magnetic moment of the magnetic element relative to the magnetic field, e.g., so that the magnetic force remains greater than the gravitational force. The apparatus is capable of sensing the level of a liquid using a combination of magnetic force and buoyancy force.

30 Claims, 2 Drawing Sheets

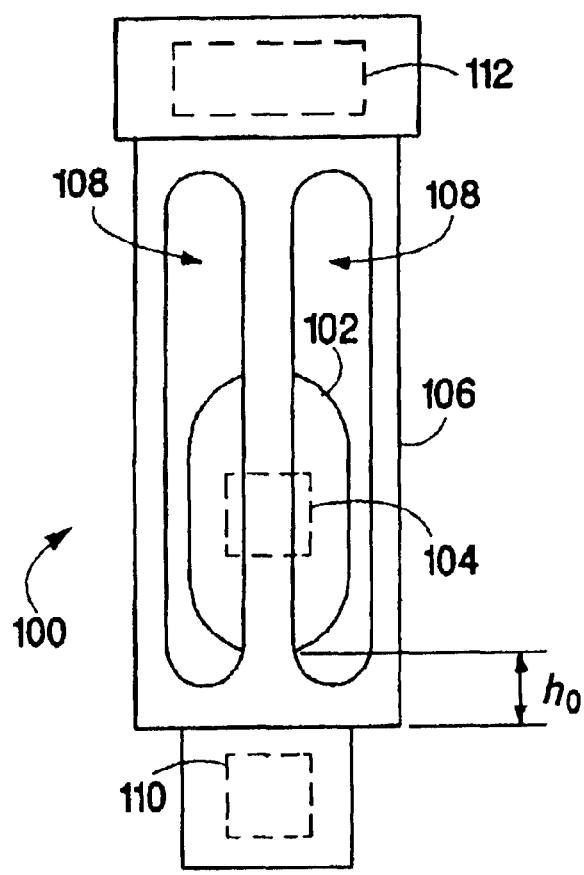
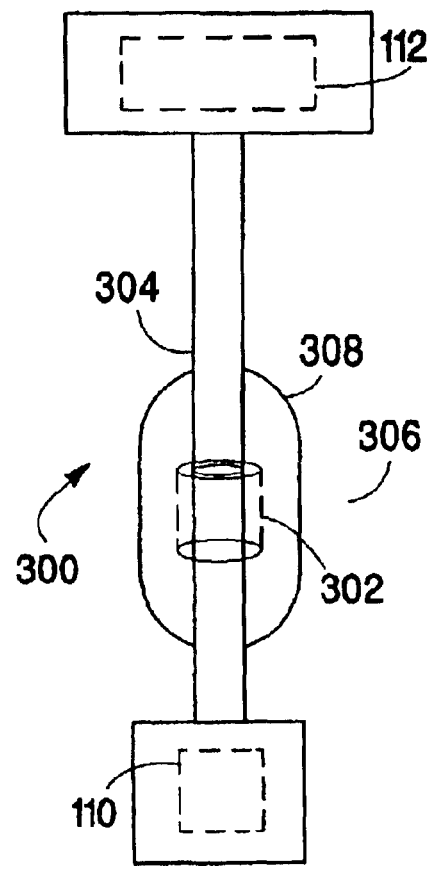
FIG. 1
FIG. 3

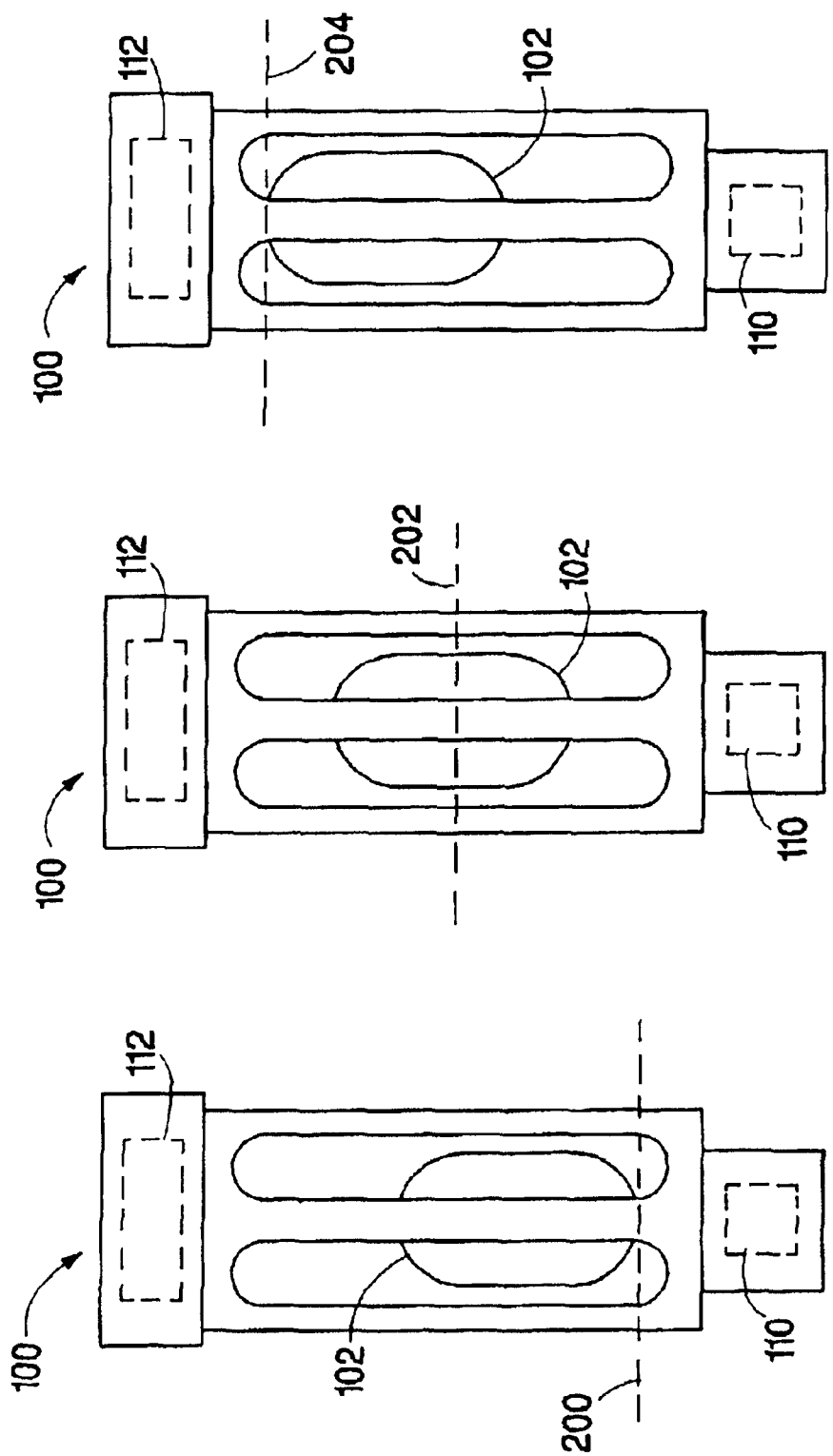

LIQUID SENSING

TECHNICAL FIELD

The invention relates to liquid sensing.

BACKGROUND

There are various ways to sense the level of a liquid in a tank, reservoir, or other liquid container. Some liquid level sensors use floats that have enough buoyancy to enable them to rise and fall with the surface of the liquid. Another type of liquid level sensor for small reservoirs is the thermister, which can be calibrated for use in high temperature fluids. Optical sensors, such as those that detect the difference between the index of refraction of air and liquid, can also be used.

Some liquid level sensors are point level sensors that indicate when a liquid has reached a predetermined height. Some liquid level sensors may indicate the level of a liquid over a continuous range.

SUMMARY

The invention relates to liquid sensing.

In one aspect, the invention features a liquid sensing apparatus, including a magnetic element, a source of magnetic field, producing on the magnetic element a magnetic force with a component that opposes a gravitational force on the magnetic element, and a structure configured to prevent rotation of the magnetic moment of the magnetic element to a point where there is no longer a magnetic force component opposing a gravitational force on the magnetic element.

Embodiments may include one or more of the following features. The structure is further configured to allow liquid to contact the magnetic element. The magnetic element is acted on by a buoyancy force of a liquid. The apparatus further includes a sensor, such as a Hall effect sensor or a reed switch, that is responsive to the position of the magnetic element. The sensor is configured to feed back a signal that is responsive to the position of the magnetic element to the source of magnetic field.

The source of magnetic field can include an electromagnetic coil or a magnet, such as a ferromagnetic material. The magnetic element can further include a non-magnetic material, such as one surrounding the magnetic material. The non-magnetic material can have density lower than the density of the magnetic material. The non-magnetic material can include a polymer.

In another aspect, the invention features a liquid sensing apparatus including a housing, a source of magnetic field associated with the housing, a sensor associated with the housing, and a magnetic element movably located within the housing, the magnetic element being between the source of magnetic field and the sensor.

In another aspect, the invention features a liquid sensing apparatus including a structure containing a post, a source of magnetic field located at a first end of the structure, a magnetic element slidably engaged with the post, and a sensor that is responsive to the position of the magnetic element at a second end of the structure.

In another aspect, the invention features a liquid sensing method. The method includes orienting a magnetic element in a magnetic field such that there is a magnetic force with a component that opposes a gravitational force on the magnetic element, and preventing the magnetic moment of the magnetic element from rotating relative to the magnetic field so that the magnetic force remains greater than the gravitational force.

Embodiments may include one or more of the following features. The method further includes contacting liquid to the magnetic element. The magnetic element is acted on by a buoyancy force of a liquid. The method further includes sensing the position of the magnetic element. The method further includes feeding back a signal that is responsive to the position of the magnetic element to the source of magnetic field.

The magnetic field can be provided by an electromagnetic coil or a magnet, such as a ferromagnetic material. The magnetic element can further include a non-magnetic material, for example, one surrounding the magnetic material. The non-magnetic material can have density lower than the density of the magnetic material. The non-magnetic material can include a polymer.

Other aspects, features, and advantages of the invention will be apparent from the description of the preferred embodiments thereof and from the claims.

DESCRIPTION OF DRAWINGS

FIG. 1 is a schematic diagram of an embodiment of a liquid sensing apparatus.

FIGS. 2A, 2B, and 2C illustrate the liquid sensing apparatus of FIG. 1 during operation.

FIG. 3 is a schematic diagram of an embodiment of a liquid sensing apparatus.

DETAILED DESCRIPTION

Referring to FIG. 1, a liquid sensing apparatus 100 is shown. Apparatus 100 includes a housing 106 (as shown, a tube) having one or more openings 108, a magnet 110 positioned at a first (e.g., bottom) end of the housing, and a sensor 112 positioned at a second (e.g., top) end of the housing. Sensor 112 is interfaced with a detector (not shown), such as an operational amplifier or analog to digital converter, for detecting the output of the sensor. Within housing 106, between magnet 110 and sensor 112, apparatus 100 includes a capsule 102 that surrounds a magnet 104. Magnets 104 and 110 are arranged such that the same magnetic poles face each other and the magnets repel each other. When apparatus 100 is placed in a liquid reservoir (not shown), openings 108 allow the liquid in the reservoir to contact capsule 102. During use, capsule 102 (and magnet 104) can rise and fall according to the liquid level in the reservoir. Sensor 112 is configured to detect the position of magnet 104, thereby providing an indication of the level of the liquid.

In particular, apparatus 100 is capable of continuously sensing the level of the liquid over a predetermined range using a combination of magnetic force and buoyancy force. When there is no liquid in the reservoir, capsule 102 floats within housing 106 due to the magnetic repulsion between magnets 104 and 110 (i.e., in preferred embodiments, the capsule does not contact the bottom of the housing, as shown in FIG. 1). Since the position of magnet 110 is fixed, capsule 102 is at an initial height, $h_0$, which is dependent on the strength of magnets 104 and 110, and the force of gravity acting on the capsule (which is proportional to its mass). In particular, the height of the capsule increases as its gravitational force (i.e. weight) decreases. With liquid in the reservoir, when capsule 102 contacts the liquid, the volume of liquid that is displaced is the same as the volume of the capsule that is submerged. Capsule 102 (and magnet 104) experiences a buoyancy force that changes its effective weight by the weight of the displaced liquid. As the level of the liquid increases capsule 102 (and magnet 104) displaces an increasing amount of liquid. As a result, an increasing buoyancy force acts on capsule 102 (and magnet 104). The effect of the decreased weight of capsule 102, due to the increased buoyancy force, allows the magnetic force to increase the height of the capsule. This change in the position of capsule 102 can be detected by sensor 112 to provide an indication of the liquid level.

In addition, the combination of a magnetic force and a buoyancy force on capsule 102 can be used to make apparatus 100 relatively compact. For an object to be sufficiently buoyant such that it floats on a liquid, the object typically has a density less than that of the liquid. Due to the high density of magnetic materials, an object containing a magnet typically encloses a relatively large volume of air or a material less dense than the liquid in order to make the entire object float. For some small reservoirs, such as an ink reservoir used in ink jet printing, the size of an object that fits inside the reservoir is limited, so sensors that use a floating object may be too large. A buoyancy force does act upon an object that is denser than the liquid the object is in, but the buoyancy force alone typically does not make the dense object rise with the liquid. By using a magnetic force on a dense object, the object can rise with the liquid, as described above.

Still referring to FIG. 1, housing 106 is generally configured to position magnet 110, capsule 102, and sensor 112 in a predetermined arrangement. Housing 106 is configured to maintain the orientation of the magnetic moment of magnet 104 with respect to the magnetic field from magnet 110 such that there is a magnetic force (e.g., repulsion) between the magnets. In particular, while housing 106 can allow capsule 102 and magnet 104 a certain degree of rotation, the housing is configured to prevent rotation of the magnetic moment of the capsule and magnet 104 to the point where the magnetic field between magnets 104 and 110 can no longer oppose the gravitational force on magnet 104. At the same time, housing 106 is configured to allow capsule 102 to move freely (e.g., vertically, as shown in FIG. 1) within the housing. Housing 106 can be made of any material that is appropriate for the environment in which apparatus 100 is used. For example, if apparatus 100 is used in a corrosive environment, housing 106 can be formed of a chemical resistant polymer.

Magnet 110 can be any material or device capable of providing a magnetic field. A suitable material is a magnet, for example, a ferromagnetic material such as neodymium-iron-boron or samarium-cobalt. Magnet 110 is positioned such that a predetermined pole (e.g., north or south) is directed to magnet 104. To remove it from harsh environments, magnet 110 can be located outside of the reservoir, provided the reservoir is constructed of non-magnetic material. As shown in FIG. 1, magnet 104 can be encapsulated by housing 106, for example, to protect the magnet from harmful environments. In other embodiments, magnet 104 can be exposed, or the entire capsule can be made up of the magnetic material. Sensor 112 can also be located on the outside of the reservoir.

In some embodiments, magnet 110 is an electromagnet. Since it can be turned on and off, an electromagnet can be used as a self-checking mechanism. When the electromagnet is turned off, the capsule, which is denser than the surrounding fluid sinks to the bottom. Sensor 112 (described below) can be used calibrate initial height $h_0$ by comparison with previous values. An electromagnet can also increase the operating range of apparatus 100 using feedback, as described below.

Sensor 112 can be any device capable of sensing the location of capsule 102, and more specifically, magnet 104. In some embodiments, sensor 112 is a Hall effect sensor, which operates by producing a voltage that is proportional to the strength of a magnetic field at its location. The voltage can provide a continuous indication of the position of magnet 104 (and capsule 102) over the operating range of the Hall effect sensor (which may be different from the operating range of capsule 102). In other embodiments, sensor 112 is a reed switch, which contains an electrical circuit that is opened or closed by magnetizable contacts. When the magnetic field (e.g., from magnet 104) is sufficiently strong, the contacts become magnetized, attract each other, and close the switch. When the magnetic field is sufficiently reduced, the contacts demagnetize to open the switch. A reed switch can provide a discrete indication of when the liquid reaches a particular level. As shown in FIG. 1, sensor 112 can be encapsulated by housing 106, for example, to protect the sensor from harmful environments.

Capsule 102 and magnet 104 are configured as a float that is movable within housing 106. Capsule 102 can have any configuration, such as a sphere, an egg shape, a rod, a ring, or a pill shape. Capsule 102 can be made of a material having any density including a low-density (e.g., lower than the density of the liquid) and/or non-magnetic material, such as aluminum or a polymer, or the capsule can be made completely of the magnetic material. The less dense the material, the more influence the buoyancy force has on the effective weight of capsule 102. As a result, a larger operating range can be achieved. In some embodiments, such as when apparatus 100 is used in harmful environments, capsule 102 is made of a chemically resistant and/or heat resistant material, such as a fluoropolymer (e.g., Kynar™). Magnet 104 can be generally the same as magnet 110. Magnet 104 is positioned in capsule 102 such that when the capsule is in housing 106, the magnets 104 and 110 have the same poles facing each other. In some embodiments, magnet 110 is positioned on a surface (e.g., top or bottom surface) of capsule 102, as shown in the Figures. Magnet 110 can be between two or more portions of capsule 102.

FIGS. 2A–2C show apparatus 100 in operation. When the liquid is at a low level where it does not contact capsule 102 (e.g., line 200), the capsule is at initial height $h_0$. Magnetic force (e.g., repulsion) and the force of gravity act on capsule 102. As the level of the liquid increases such that capsule 102 is partially submerged (e.g., line 202), in addition to the magnetic force and the force of gravity, a buoyancy force acts on capsule 102, which changes the position (height) of the capsule. As the height of capsule 102 rises with increasing liquid level, sensor 112 detects the change in position of magnet 104 and provides an indication of the capsule, and thus the liquid level. When the liquid reaches a high level (e.g., until capsule 102 is fully submerged under the liquid (line 204)), there is no longer a change in buoyancy force if the liquid rises further. As a result, apparatus 100 has a finite operating range over which capsule 102 can continuously sense a change in liquid level.

In some cases, (for example, for reservoirs of limited size) the operating range of apparatus 100 can be increased. The operating range R is determined by the difference between the initial height, $h_0$, of capsule 102 and its height when fully submerged, $h_s$: $R = h_s - h_0$. To increase (e.g., maximize) R, $h_s$ can be increased (e.g., maximized) and/or $h_0$ can be decreased (e.g., minimized), within practical limits. For a reservoir of a given size, the available space may determine a maximum value of $h_s$. The value of $h_0$ is preferably sufficiently large so that capsule 102 does not contact, for example, the bottom of housing 106 which may determine a minimum value of $h_0$. Sometimes, sensor 112 may have a limited range and not be able to sense the position of magnet 104 beyond a certain distance, which could determine a minimum practical value of $h_0$.

There are several parameters that can be changed to set the values of $h_s$ and $h_0$, e.g., near their maximum and minimum values. Changing parameters such as the mass of capsule 102 and the strength of the magnets (which can be quantified as the product of the magnitudes of their effective magnetic moments) changes the values of $h_s$ and $h_0$ in the same direction (i.e., they both increase or they both decrease). Since the values of $h_s$ and $h_0$ may need to change in opposite directions, other parameters can be used. For example, without increasing the mass of capsule 102, its volume can be increased (or its density decreased) to increase the value of $h_s$ without a corresponding increase in $h_0$. Reservoir size and material densities may limit the increase in range R.

Alternatively or in addition, to control the values of $h_s$ and $h_0$ separately, some parameters can be made variable, e.g., dependent on the height of capsule 102. For example, if an electromagnet is used for magnet 110, then sensor 112 can be used to feed back a signal based on the position of magnet 104 to the electromagnet so that its strength increases with the height of magnet 104. The current in the coil of the electromagnet can be set to be an increasing function of the height of magnet 104. This approach increases the range R by allowing the magnetic strength to be stronger when capsule 102 is high to raise $h_s$, and weaker when the capsule is low to lower $h_s$.

In other embodiments, multiple sensing apparatuses can be placed at different levels in the reservoir, for example, to provide an indication of the level of a liquid in a reservoir over a large range.

Still other embodiments are possible. For example, referring to FIG. 3, a liquid sensing apparatus 300 includes a post 304 on which a magnet 302 inside a capsule 308 may slide. Post 304 maintains the orientation of magnet 302 and capsule 308, and housing 306 allows free flow of liquid and air around the capsule. Additionally, a reservoir could be designed where the capsule is the only part of the sensor inside the reservoir. Magnet 110 can be located on the outside of the reservoir and sensor 112 can be located on the outside of the reservoir thus limiting the penetrations into the reservoir and decreasing the chances for leaks or contamination from outside.

Other embodiments are within the claims.

What is claimed is:

1. A liquid sensing apparatus, comprising:
   a magnetic element;
   a source of magnetic field, producing on the magnetic element a magnetic force with a component that opposes a gravitational force on the magnetic element; and
   a structure configured to prevent rotation of the magnetic moment of the magnetic element to a point where there is no longer a magnetic force component opposing a gravitational force on the magnetic element.

2. The apparatus of claim 1 wherein the structure is further configured to allow liquid to contact the magnetic element.

3. The apparatus of claim 1 wherein the magnetic element is acted on by a buoyancy force of a liquid.

4. The apparatus of claim 1 further comprising a sensor that is responsive to the position of the magnetic element.

5. The apparatus of claim 4 wherein the sensor comprises a Hall effect sensor.

6. The apparatus of claim 4 wherein the sensor comprises a reed switch.

7. The apparatus of claim 4 wherein the sensor is configured to feed back a signal that is responsive to the position of the magnetic element to the source of magnetic field.

8. The apparatus of claim 1 wherein the source of magnetic field comprises an electromagnetic coil.

9. The apparatus of claim 1 wherein the source of magnetic field comprises a magnetic material.

10. The apparatus of claim 1 wherein the magnetic element comprises a magnetic material.

11. The apparatus of claim 10 wherein the magnetic element further comprises a non-magnetic material.

12. The apparatus of claim 11 wherein the non-magnetic material surrounds the magnetic material.

13. The apparatus of claim 11 wherein the magnetic material is positioned on a surface of the non-magnetic material.

14. The apparatus of claim 11 wherein the non-magnetic material has density lower than the density of the magnetic material.

15. The apparatus of claim 11 wherein the non-magnetic material comprises a polymer.

16. A liquid sensing apparatus, comprising:
    a magnetic element;
    a source of magnetic field, producing on the magnetic element a magnetic force with a component that opposes a gravitational force on the magnetic element; and
    a structure configured to prevent rotation of the magnetic moment of the magnetic element relative to the magnetic field so that the magnetic force remains greater than the gravitational force.

17. A liquid sensing apparatus comprising:
    a housing;
    a source of magnetic field associated with the housing;
    a sensor associated with the housing; and
    a magnetic element movably located within the housing, the magnetic element being between the source of magnetic field and the sensor.

18. A liquid sensing apparatus comprising:
    a structure containing a post;
    a source of magnetic field located at a first end of the structure;
    a magnetic element slidably engaged with the post; and
    a sensor that is responsive to the position of the magnetic element at a second end of the structure.

19. A liquid sensing method comprising:
    orienting a magnetic element in a magnetic field such that there is a magnetic force with a component that opposes a gravitational force on the magnetic element; and
    preventing the magnetic moment of the magnetic element from rotating relative to the magnetic field so that the magnetic force remains greater than the gravitational force.

20. The method of claim 19 further comprising contacting liquid to the magnetic element.

21. The method of claim 19 wherein the magnetic element is acted on by a buoyancy force of a liquid.

22. The method of claim 19 further comprising sensing the position of the magnetic element.

23. The method of claim 22 further comprising feeding back a signal that is responsive to the position of the magnetic element to the source of magnetic field.

24. The method of claim 19 wherein the magnetic field is provided by an electromagnetic coil.

25. The method of claim 19 wherein the magnetic field is provided by a magnetic material.

26. The method of claim 19 wherein the magnetic element comprises a magnetic material.

27. The method claim 26 wherein the magnetic element further comprises a non-magnetic material.

28. The method of claim 27 wherein the non-magnetic material surrounds the magnetic material.

29. The method of claim 27 wherein the non-magnetic material has density lower than the density of the magnetic material.

30. The method of claim 27 wherein the non-ferromagnetic material comprises a polymer.

* * * * *